(12) United States Patent
Kawahara et al.

(10) Patent No.: US 7,755,331 B2
(45) Date of Patent: Jul. 13, 2010

(54) STORAGE BATTERY MANAGING APPARATUS AND VEHICLE CONTROLLING APPARATUS PROVIDING THE SAME

(75) Inventors: Youhei Kawahara, Hitachi (JP); Akihiko Emori, Hitachi (JP); Shuko Yamauchi, Hitachi (JP); Hirotaka Takahashi, Hitachinaka (JP); Masami Shida, Mito (JP); Yoshinori Aoshima, Tsukubamirai (JP)

(73) Assignee: Hitachi, Ltd., Tokyo (JP)

( * ) Notice: Subject to any disclaimer, the term of this patent is extended or adjusted under 35 U.S.C. 154(b) by 83 days.

(21) Appl. No.: 11/873,914

(22) Filed: Oct. 17, 2007

(65) Prior Publication Data
US 2008/0156551 A1 Jul. 3, 2008

(30) Foreign Application Priority Data
Oct. 19, 2006 (JP) .............................. 2006-284570

(51) Int. Cl.
*H02J 7/06* (2006.01)
(52) U.S. Cl. .................. 320/164; 320/159; 320/161
(58) Field of Classification Search ................ 180/65.1; 320/164, 118, 132, 106, 136, 159, 161, 162, 320/151, 152; 324/434, 429, 433, 127, 427; 701/36, 22
See application file for complete search history.

(56) References Cited

U.S. PATENT DOCUMENTS

| | | | | |
|---|---|---|---|---|
| 4,119,904 A | * | 10/1978 | Haglund | 320/136 |
| 4,316,229 A | * | 2/1982 | Helwig, Jr. | 361/42 |
| 5,302,902 A | * | 4/1994 | Groehl | 324/434 |
| 5,321,627 A | * | 6/1994 | Reher | 324/427 |
| 5,587,924 A | * | 12/1996 | Rossi | 320/106 |
| 5,595,064 A | * | 1/1997 | Ikeda et al. | 180/65.1 |
| 5,652,501 A | * | 7/1997 | McClure et al. | 320/118 |
| 5,900,734 A | * | 5/1999 | Munson | 324/433 |
| 6,014,059 A | * | 1/2000 | Nordwall | 330/289 |
| 6,107,926 A | * | 8/2000 | Kifuku et al. | 340/650 |
| 6,236,215 B1 | * | 5/2001 | Kanehira | 324/429 |
| 6,252,377 B1 | * | 6/2001 | Shibutani et al. | 320/132 |
| 6,777,914 B2 | * | 8/2004 | Ullrich et al. | 320/132 |

(Continued)

FOREIGN PATENT DOCUMENTS

JP 2002-272011 A 9/2002

(Continued)

OTHER PUBLICATIONS

Japanese Office Action dated Nov. 4, 2009 (Three (3) pages).

*Primary Examiner*—Hau V Phan
(74) *Attorney, Agent, or Firm*—Crowell & Moring LLP

(57) ABSTRACT

A storage battery managing apparatus which ensures charge-discharge control of a storage battery in consideration of state variation of each unit cell even if the battery pack includes a number of component unit cells, and a vehicle controlling apparatus providing the same. A storage battery includes a plurality of chargeable-dischargeable unit cells connected in which battery management ICs detect the cell voltage of each unit cell, a voltage sensor detects a storage battery voltage and a current sensor detects currents to be charged and discharged in the storage battery. A degree of SOC imbalance is obtained by use of detected cell voltage of each unit cell when the storage battery is being neither charged nor discharged.

5 Claims, 7 Drawing Sheets

U.S. PATENT DOCUMENTS

| | | | | |
|---|---|---|---|---|
| 7,242,557 B2 * | 7/2007 | Ward | ............................ | 361/42 |
| 7,522,981 B2 * | 4/2009 | Kim et al. | ...................... | 701/36 |
| 7,531,990 B2 * | 5/2009 | Morita et al. | ................ | 320/164 |
| 7,541,800 B2 * | 6/2009 | Lee et al. | ..................... | 324/127 |

FOREIGN PATENT DOCUMENTS

| | | |
|---|---|---|
| JP | 2003-303627 A | 10/2003 |
| JP | 2005-117722 A | 4/2005 |
| JP | 2006-242880 A | 9/2006 |

* cited by examiner

FIG.2

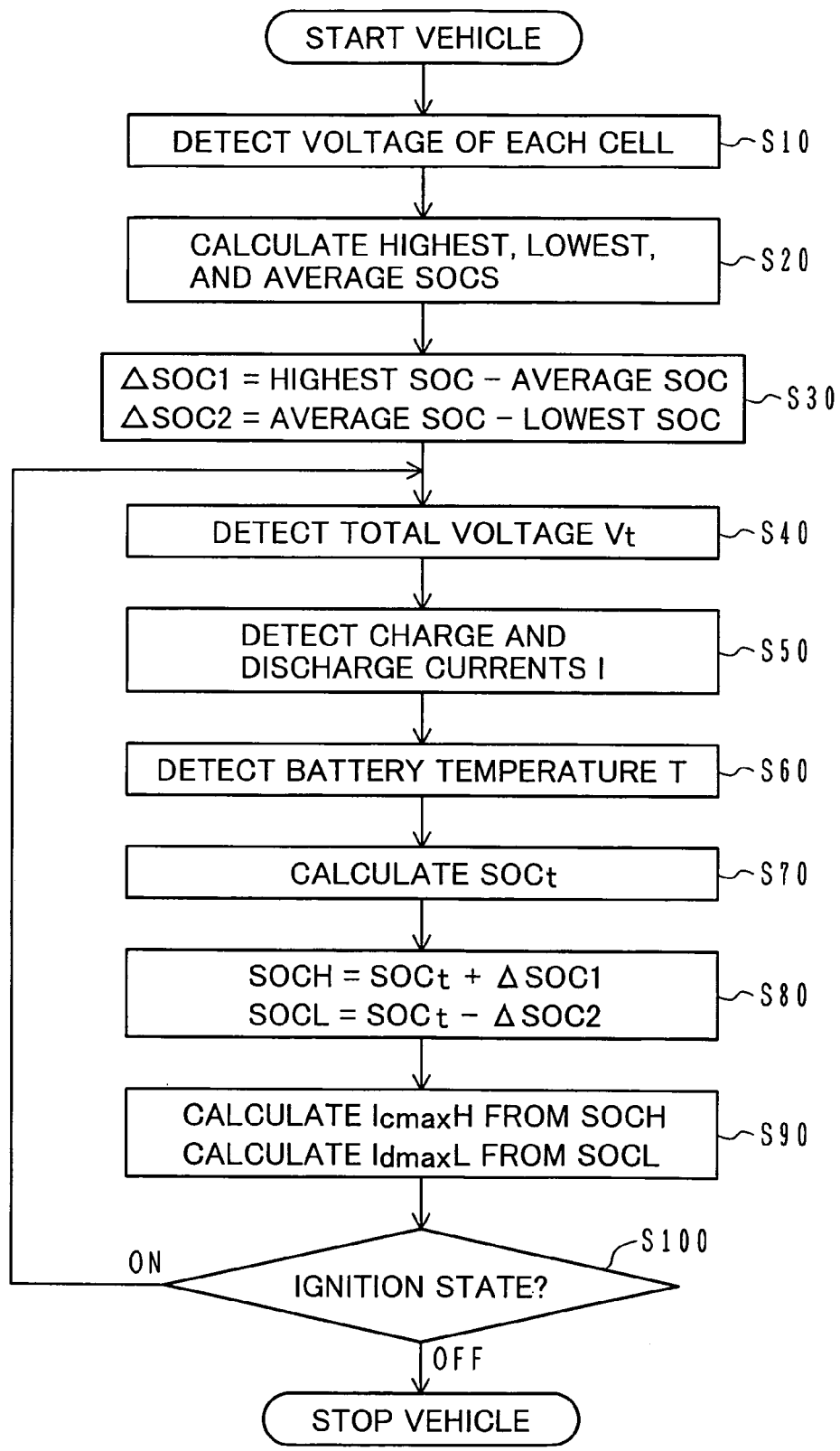

START VEHICLE
↓
DETECT VOLTAGE OF EACH CELL — S10
↓
CALCULATE HIGHEST, LOWEST, AND AVERAGE SOCS — S20
↓
ΔSOC1 = HIGHEST SOC − AVERAGE SOC
ΔSOC2 = AVERAGE SOC − LOWEST SOC — S30
↓
DETECT TOTAL VOLTAGE Vt — S40
↓
DETECT CHARGE AND DISCHARGE CURRENTS I — S50
↓
DETECT BATTERY TEMPERATURE T — S60
↓
CALCULATE SOCt — S70
↓
SOCH = SOCt + ΔSOC1
SOCL = SOCt − ΔSOC2 — S80
↓
CALCULATE IcmaxH FROM SOCH
CALCULATE IdmaxL FROM SOCL — S90
↓
IGNITION STATE? — S100
ON → (loop back)
OFF ↓
STOP VEHICLE

STORAGE BATTERY MANAGING APPARATUS AND VEHICLE CONTROLLING APPARATUS PROVIDING THE SAME

BACKGROUND OF THE INVENTION

1. Field of the Invention

The present invention relates to a storage battery managing apparatus for managing charge-discharge of a storage battery and a vehicle controlling apparatus providing the same. More particularly, the present invention relates to a storage battery managing apparatus suitable for charge-discharge control of a battery pack composed of a plurality of unit cells, and a vehicle controlling apparatus providing the same.

2. Description of the Related Art

A vehicle is provided with a storage battery, such as a lead-acid battery, a nickel hydride battery, a lithium ion battery, or the like mounted thereon. The power necessary to start up an engine, use electric equipment, or drive a hybrid car or an electric vehicle is supplied from the storage battery.

The storage battery is provided with a maximum permissible current that can be inputted or outputted according to the present state. If the storage battery is charged or discharged with the maximum permissible current exceeded, the battery voltage deviates from a normal control range possibly resulting in overcharge or overdischarge. Generally, the higher the SOC (State Of Charge) of the storage battery, the smaller a maximum permissible charge current and the larger a maximum permissible discharge current. Further, the lower the SOC of the storage battery, the smaller the maximum permissible discharge current and the larger the maximum permissible charge current. In order to optimally use the storage battery, it is necessary to control the charge and discharge of the storage battery within a range of the maximum permissible current according to various states of the storage battery.

Generally, a battery pack having a plurality of unit cells is used as a storage battery for hybrid cars and electric vehicles. If state variations occur in the plurality of unit cells included in the battery pack, the maximum permissible current differ for each unit cell. Therefore, it is necessary to control the charge and discharge of the storage battery in consideration of state variations is required.

Conventionally, as a technique for a charge-discharge controlling apparatus for a chargeable-dischargeable battery pack composed of a plurality of cells, a technique disclosed, for example, in JP-A-2005-117722 is known. With the technique, the SOC of each cell is detected and the upper-limit value used as a target value for stopping the charge of the battery pack-and the lower-limit value used as a target value for stopping discharge thereof are changed based on the SOC of each cell.

SUMMARY OF THE INVENTION

However, with increasing number of component unit cells included in the battery pack, it becomes difficult to change a charge-discharge target value by periodically calculating SOCs of all unit cells because of the throughput of the controlling apparatus. Therefore, there has been a problem that it is difficult to control the charge and discharge of the storage battery in consideration of state variation of each unit if the battery pack includes a number of component unit cells.

The technique disclosed in JP-A-2005-117722 does not take into consideration the battery impedance that depends on the SOCs and temperature. In order to ensure charge-discharge control of the storage battery, it is necessary to manage charge-discharge current and charge-discharge power according to the impedance and voltage of the battery.

An object of the present invention is to provide a storage battery managing apparatus that can ensure charge-discharge control of the storage battery in consideration of state variation of each unit cell even if the battery pack includes a number of component unit cells, and a vehicle controlling apparatus providing the same.

(1) In order to attain the above-mentioned object, the present invention provides a storage battery managing apparatus comprising: a storage battery having a plurality of chargeable-dischargeable unit cells connected therein; cell voltage detection means for detecting the voltage of each unit cell; storage battery voltage detection means for detecting the storage battery voltage; and current detection means for detecting a current flowing under no-load conditions or charge-discharge conditions of the storage battery. The storage battery managing apparatus includes processing means for obtaining a degree of SOC imbalance by use of the cell voltage of each unit cell detected by the cell voltage detection means when the storage battery is being neither charged nor discharged; and calculating highest and lowest SOCs from the average SOC obtained from the storage battery voltage detected by the storage battery voltage detection means and the degree of SOC imbalance when the storage battery is being charged or discharged, thereby managing the charge-discharge current and charge-discharge power.

The above-mentioned configuration makes it possible to ensure charge-discharge control of the storage battery in consideration of state variation of each unit cell even if the battery pack includes a number of component unit cells.

(2) Preferably in (1) above, the above-mentioned processing means, when the storage battery is being neither charged nor discharged, performs the steps of: converting the cell voltage of each unit cell detected by the cell voltage detection means to SOC; detecting an average SOC of the storage battery from an average of the plurality of SOCs; detecting highest and lowest SOCs from the plurality of SOCs; calculating $\Delta SOC1$ by use of the highest and average SOCs (Highest SOC—Average SOC); and calculating $\Delta SOC2$ by use of the average and lowest SOCs (Average SOC—Lowest SOC); thus detecting the degree of SOC imbalance of the storage battery.

(3) Preferably in (2) above, the processing means, when the storage battery is being charged or discharged, performs the steps of: calculating an estimated highest SOC (SOCmax) from the average SOC obtained from the storage battery voltage detected by the storage battery voltage detection means and the degree of SOC imbalance, $\Delta SOC1$; and calculating an estimated lowest SOC (SOCmin) from the average SOC and the degree of SOC imbalance, $\Delta SOC2$.

(4) Preferably in (3) above, the processing means determines a permissible charge current or permissible charge power based on the estimated highest SOC; and determines a permissible discharge current or permissible discharge power based on the estimated lowest SOC.

(5) Preferably in (4) above, the processing means performs the steps of: obtaining an impedance of the storage battery corresponding to the estimated highest SOC; determining a current value or a power value, with which the storage battery having an impedance of the estimated highest SOC does not reach a maximum voltage (control target), as a permissible charge current or permissible charge power; obtaining an impedance of the storage battery corresponding to the estimated lowest SOC; and determining a current value or a power value, with which the storage battery having an impedance of the estimated lowest SOC does not fall below a minimum voltage (control target), as a permissible discharge current or permissible discharge power.

(6) Further, in order to attain the object, the present invention provides a storage battery managing apparatus and a vehicle controlling apparatus. The storage battery managing apparatus comprises: a storage battery having a plurality of chargeable-dischargeable unit cells connected therein; cell voltage detection means for detecting the voltage of each unit cell; storage battery voltage detection means for detecting the storage battery voltage; and current detection means for detecting a current flowing under no-load conditions or charge-discharge conditions of the storage battery. The vehicle controlling apparatus includes vehicle control means that performs the steps of: converting the power supplied from the storage battery to AC power by use of an inverter; supplying the AC power to a vehicle drive motor; converting the power outputted when the motor operates as a dynamo by use of the inverter; storing the power in the storage battery; and controlling the inverter; thereby controlling the drive of the motor. The storage battery managing apparatus includes processing means for obtaining a degree of SOC imbalance by use of the cell voltage of each unit cell detected by the cell voltage detection means when the storage battery is being neither charged nor discharged; and calculating highest and lowest SOCs from the average SOC obtained from the storage battery voltage detected by the storage battery voltage detection means and the degree of SOC imbalance when the storage battery is being charged or discharged, thereby managing the charge-discharge current and charge-discharge power. The vehicle control means controls the inverter such that the storage battery is operated within ranges of the permissible charge currents or the permissible charge power and the permissible discharge current or the permissible discharge power determined by the storage battery managing apparatus.

The above-mentioned configuration makes it possible to ensure charge-discharge control of the storage battery in consideration of state variation of each unit cell even if the battery pack includes a number of component unit cells.

BRIEF DESCRIPTION OF THE DRAWINGS

FIG. 2 is a flow chart showing operations of processing means in the storage battery managing apparatus according to an embodiment of the present invention.

DESCRIPTION OF THE PREFERRED EMBODIMENTS

Configurations and operations of a storage battery managing apparatus according to an embodiment of the present invention will be explained below with reference to FIGS. 1 to 6.

First of all, a system configuration of a hybrid car that mounts the storage battery managing apparatus according to the present embodiment will be explained below with reference to FIG. 1.

Figure 1:
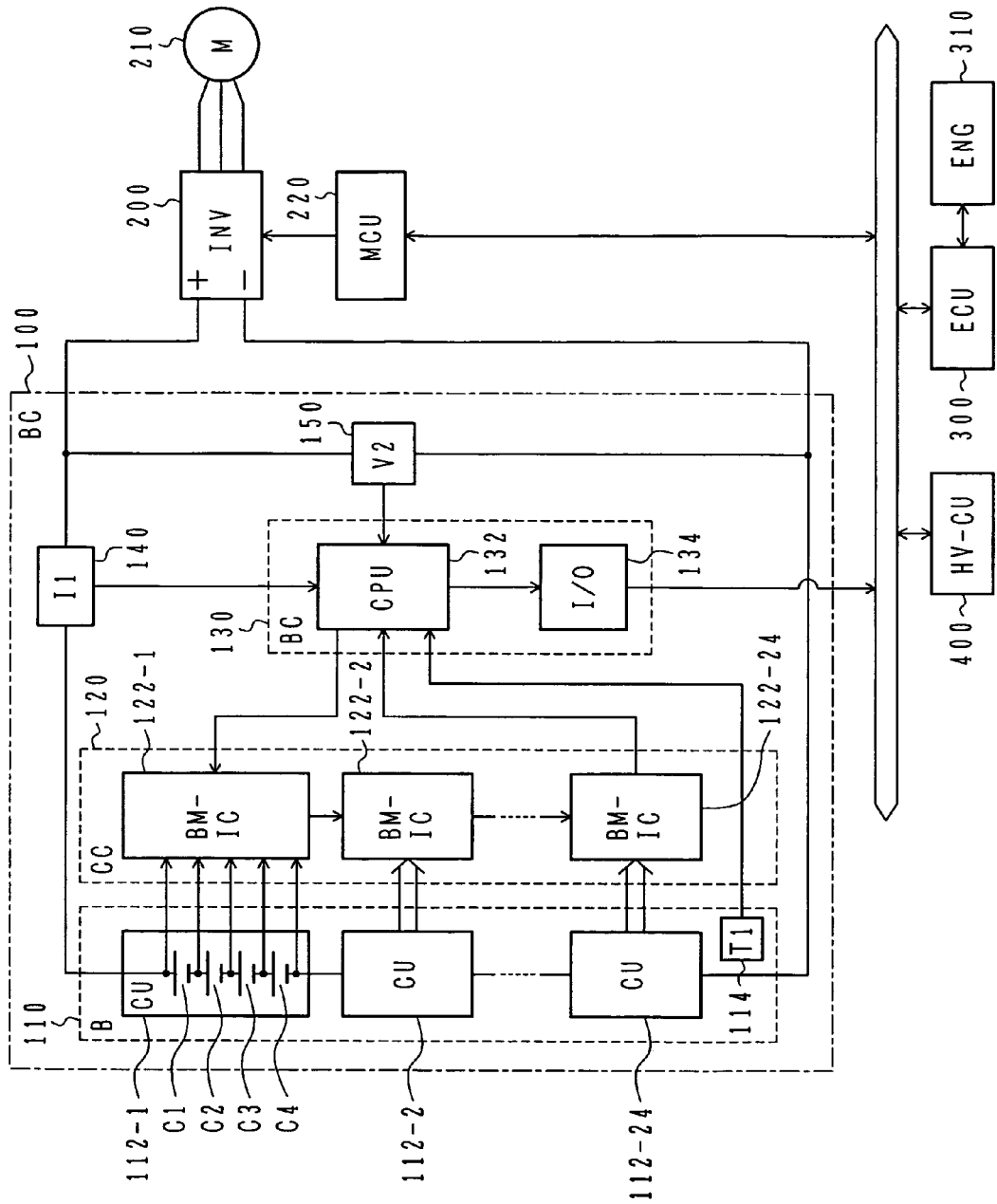
FIG. 1 is a system block diagram showing a system configuration of a hybrid car that mounts a storage battery managing apparatus according to an embodiment of the present invention.

FIG. 1 is a system block diagram showing a system configuration of a hybrid car that mounts the storage battery managing apparatus according to an embodiment of the present invention.

The storage battery controlling apparatus (BCA) 100 according to the present embodiment includes a storage battery (B) 110, a cell controller (CC) 120, a battery controller (BC) 130, a current sensor (I1) 140, and a voltage sensor (V2) 150.

A storage battery 110, a secondary battery, is a chargeable-dischargeable storage device, such as a lead-acid battery, a nickel hydride battery, a lithium ion battery, an electric double layer capacitor, or the like. With the storage battery 110 used for a hybrid car or an electric vehicle, it is common to connect in series or parallel a plurality of chargeable-dischargeable unit cells, such as a nickel hydride battery, a lithium ion battery, or the like. With the present embodiment, four unit cells C1, C2, C3, and C4 are connected in series to form each of cell units (CUs) 112-1, 112-2, . . . , and 112-24. A total of 12 cell units 112-1, . . . , and 112-12 connected in series are stored in a case to form a first storage battery module, and another 12 cell units 112-13, . . . , and 112-24 connected in series are stored in a case to form a second storage battery module. The first and second storage battery modules are further connected in series. Therefore, a total of 48 unit cells are connected in series in each of the two storage battery modules. When the maximum voltage of a unit cell is about 4V, the maximum voltage of the two storage battery modules connected in series is about 400V. A temperature sensor 114 is provided in the storage battery 110. With the present embodiment, eight temperature sensors 114 are provided. Specifically, four temperature sensors are arranged in the first storage battery module and another four in the second storage battery module. When the first storage battery module is noticed, temperature distribution occurs therein forming an area having comparatively high temperature (high temperature area) and an area having comparatively low temperature (low temperature area). Therefore, two temperature sensors are arranged in the high temperature area and two in the low temperature area. Outputs of temperature sensors 114 are fed to processing means (CPU) 132 in a battery controller 130. The processing means 132 detects the temperature of the storage battery 110 based on an average of temperature data detected by the eight temperature sensors.

The cell controller (CC) 120 is composed of 24 battery management ICs (BM-ICs) 122-1, 122-2, . . . , and 122-24. The battery management IC 122-1 is provided corresponding to the cell unit 112-1. The battery management IC 122-1 includes a voltage sensor which detects the voltage of each of the four unit cells C1, C2, C3, and C4 which form the cell unit 112-1. The battery management ICs 122-2, . . . , and 122-24 detect voltages of four unit cells that form the cell units 112-2, . . . , and 112-24, respectively. The battery management ICs 122-1, 122-2, . . . , and 122-24 are connected in a daisy-chain form to the processing means (CPU) 132 in the battery controller 130, and the voltage of each unit cell is fed to the processing means 132. It may also be possible to connect each of the battery management ICs 122-1, 122-2, ..., and 122-24 to the processing means 132 in a star form.

The battery management ICs 122 are provided inside or outside the storage battery 110. It may also be possible to provide the battery management ICs 122 by selecting two or more cell units 112 provided in the storage battery 110.

A voltage between both ends of the storage battery 110 is supplied to an inverter 200. The inverter 200 converts the DC voltage to AC voltage and supplies the AC voltage to a three-phase synchronous motor (M) 210. The power supplied to the motor 210 is controlled by a motor control unit (MCU) 220. Further, while the synchronous motor 210 is operating as a generator, the inverter converts the output voltage of the motor 210 to DC voltage and then charges the DC voltage in the storage battery 110.

The current supplied from the storage battery 110 to the inverter 200 or the current supplied from the inverter 200 to the storage battery 110 is detected by the current sensor (I1) 140. The current detected by the current sensor 140 is fed to the processing means (CPU) 132 in the battery controller 130. Further, the voltage between both ends of the storage battery 110 is detected by a voltage sensor (V2) 150. The voltage detected by the voltage sensor 150 is fed to the processing means (CPU) 132 in the battery controller 130.

The battery controller (BC) 130 is provided with the processing means (CPU) 132 and an output means (I/O) 134.

The processing means 132 performs calculations regarding the condition of the storage battery 110 based on voltage data of each unit cell detected by the battery management ICs 122, voltage data detected by the voltage sensor 150, current data detected by the current sensor 140, and temperature data detected by the temperature sensors 114. The output means 134 outputs a result calculated by the processing means 132 through a communication lines such as a CAN bus.

An engine control unit (ECU) 300 which controls an engine (ENG) 310, the motor control unit 220, and a hybrid control unit 400 which integrally controls the engine control unit 300 are connected to the CAN bus.

The processing means 132 detects the state of the storage battery 110 based on cell voltages obtained by the battery management ICs 122 provided in the storage battery 110, battery temperatures obtained by the temperature sensors 114, a total voltage of the storage battery 110 obtained by the voltage sensor 150, a current value of the storage battery 110 obtained by the current sensor 140, and characteristic information of the storage battery 110 prestored in the processing means 132. The processing means 132 is a controller, a computer system, a microcomputer composed of a storage apparatus, a CPU, etc., or any other means that can input information, perform calculations, and output a result. Further, various sensors and the processing means 132 may be realized as a microcomputer formed on the same device, and various sensors and the processing means 132 may be provided together inside the storage battery 110.

The output means 134 transmits a result of state detection of the storage battery 110 obtained by the processing means 132. In addition to means for outputting information to the CAN bus, the output means 134 can be a network, a wireless LAN, wire communication means, wireless communication means, or any other means that can output a result of calculation by the processing means 132 to the outside.

Operations of the processing means 132 in the storage battery managing apparatus according to the present embodiment will be explained below with reference to FIGS. 2 to 6.

Figure 3:
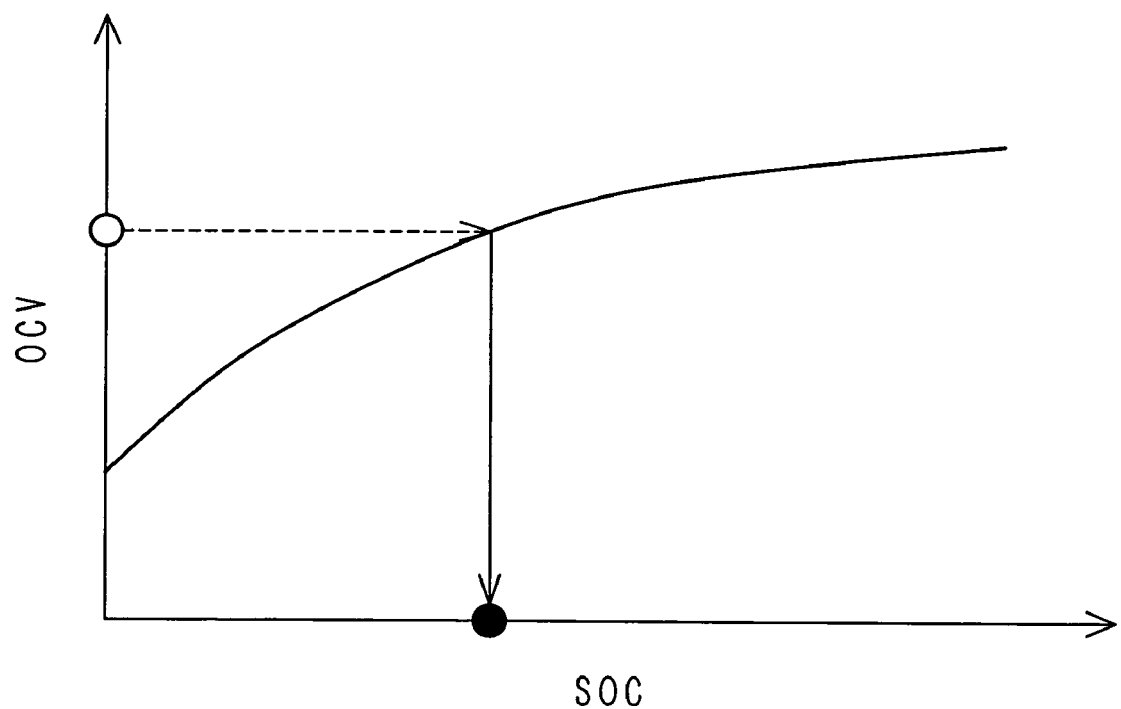
FIG. 3 is the diagram showing the relation between no-load battery voltage of a secondary battery used for the storage battery managing apparatus according to an embodiment of the present invention and SOC.
Figure 4A:
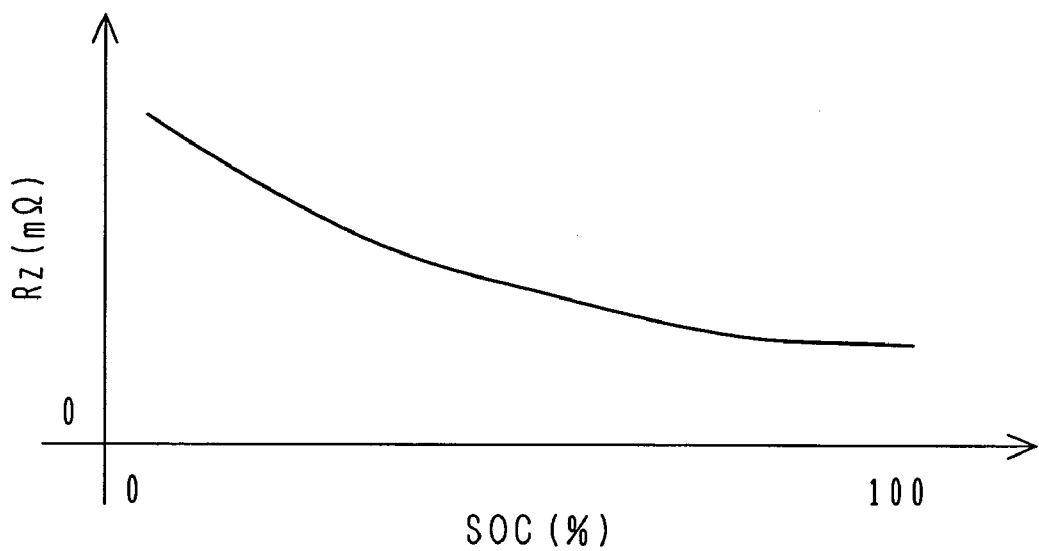
FIGS. 4A and 4B are diagrams showing the dependence of the impedance of a secondary battery used for the storage battery managing apparatus according to an embodiment of the present invention on the temperature and SOC.
Figure 4B:
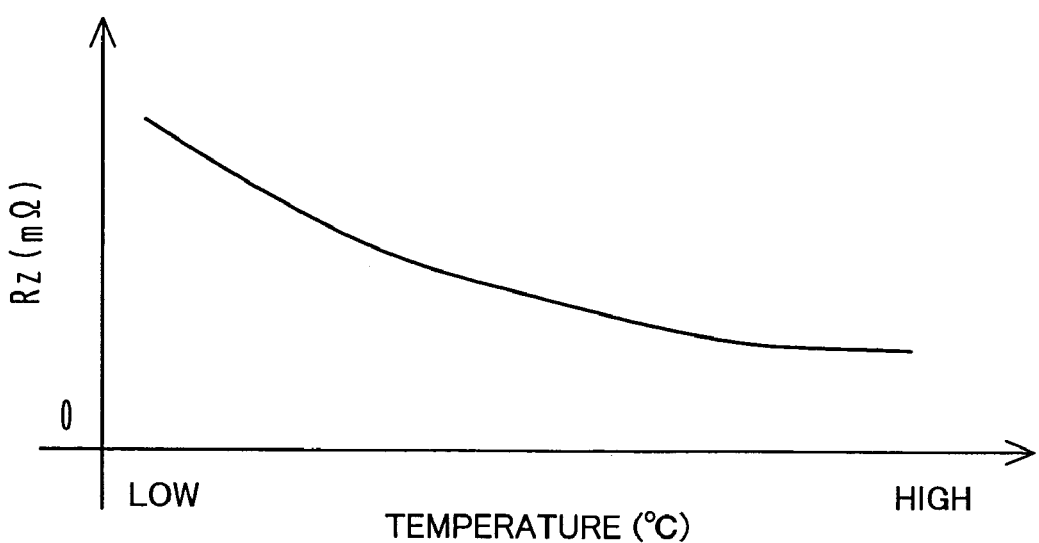

FIG. 2 is a flow chart showing operations of the processing means in the storage battery managing apparatus according to an embodiment of the present invention. FIG. 3 is the diagram showing the relation between no-load battery voltage of a secondary battery used for the storage battery managing apparatus according to an embodiment of the present invention and SOC. FIGS. 4A and 4B are diagrams showing the dependence of the impedance of a secondary battery used for the storage battery managing apparatus according to an embodiment of the present invention on the temperature and SOC.

Figure 5:
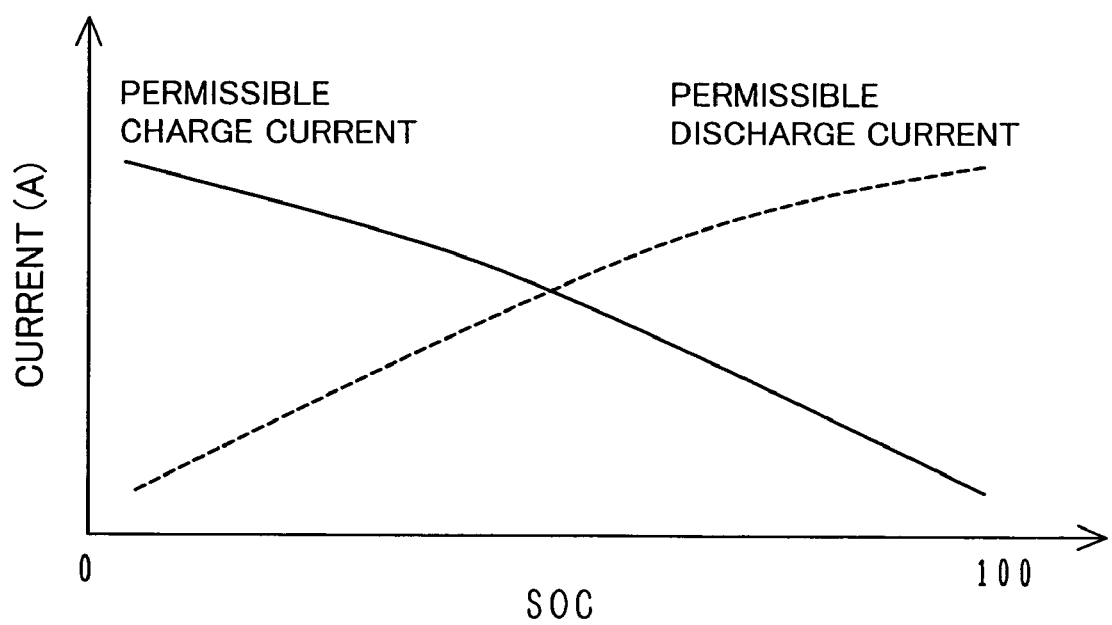
FIG. 5 is a diagram showing the relation between permissible discharge current and permissible charge current and SOC calculated by the storage battery managing apparatus according to an embodiment of the present invention.
Figure 6:
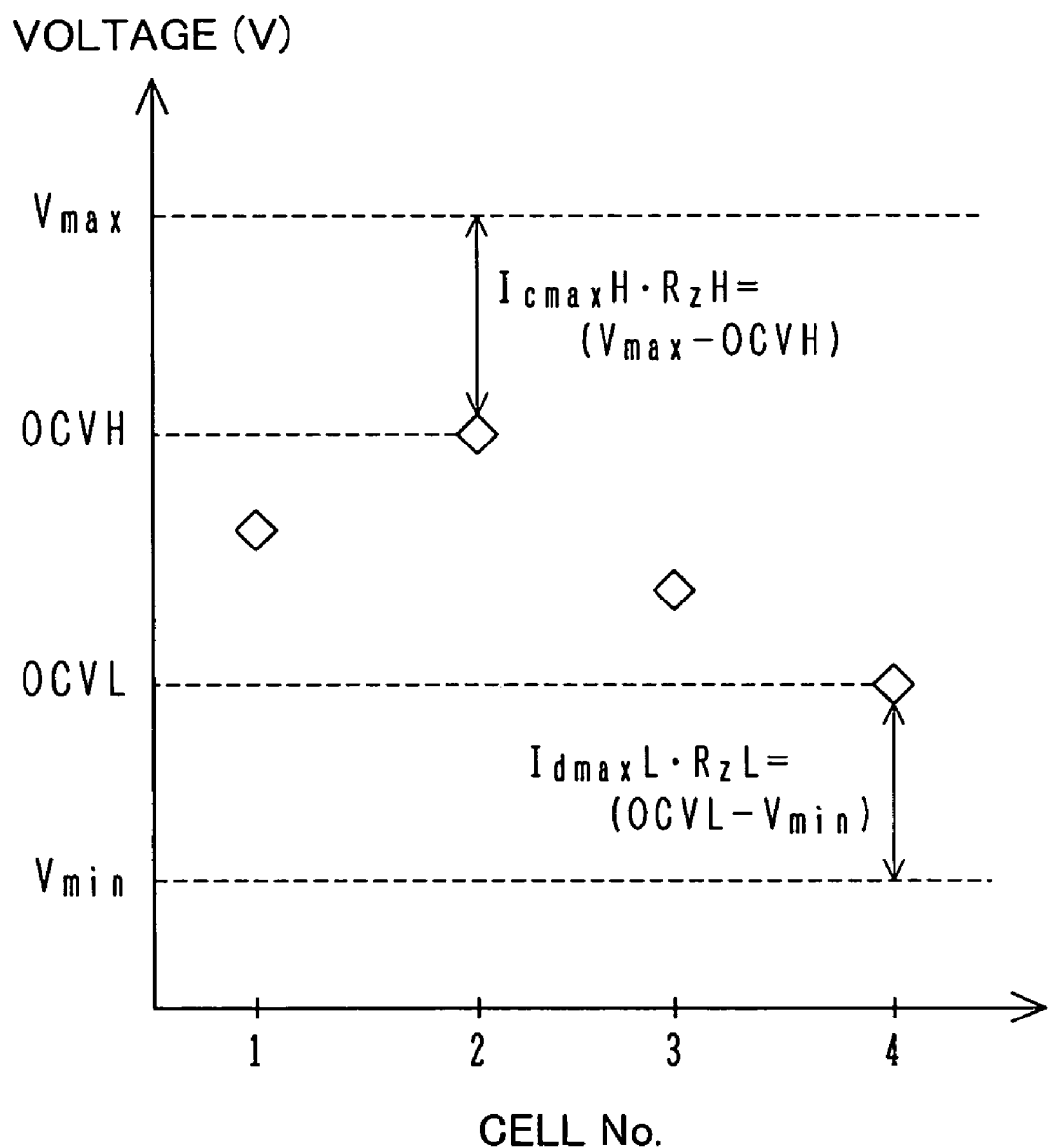
FIG. 6 is a diagram showing the relation between permissible discharge current and permissible charge current and SOC calculated by the storage battery managing apparatus according to an embodiment of the present invention.

FIGS. 5 and 6 are diagrams showing the relation between permissible discharge current and permissible charge current and SOC calculated by the storage battery managing apparatus according to an embodiment of the present invention.

First of all, the processing means 132 detects a start of a vehicle. As means for detecting a start of the vehicle, it may also be possible that the processing means 132 receives a signal which notifies a start of the vehicle from a controller which control the vehicle, such as an ECU provided outside the processing means 132, or a signal that can detect a start of the vehicle, such as a KeyON signal.

When the vehicle is started up, the processing means 132 performs processing of Steps S10 to S30 explained below.

In Step S10, when the processing means 132 detects a start of a vehicle, it detects the cell voltage of each of the plurality of unit cells connected in series included in the storage battery 110 by use of the battery management ICs 122. Referring to FIG. 1, a loop communication line is formed from the processing means 132 to the battery management IC 122-1, from the battery management IC 122-1 to the battery management IC 122-2, ..., and from the battery management IC 122-24 to the processing means 132. A detection result of the cell voltage of each unit cell is transmitted to the processing means 132 through the loop communication line. However, it may also be possible that each of the plurality of battery management ICs 122 transmits information to the processing means 132 or that a plurality of results detected by the battery management ICs 122 collectively be transmitted to the processing means 132.

Then, in Step S20, after reception of the cell voltage of each unit cell, the processing means 132 obtains a maximum voltage, a minimum voltage, and an average cell voltage by use of all the received cell voltages, and then converts the obtained results respectively to a (detected) highest SOC (State Of Charge), a (detected) lowest SOC, and an average SOC.

Here, as shown in FIG. 3, there is a strong correlation between no-load battery voltage (OCV: Open Circuit Voltage) and SOC (State Of Charge). When the vehicle is started up, the storage battery 110 is neither performing charge nor discharge and therefore the measured cell voltage of each unit cell can be handled as the OCV. Storage means in the processing means 132 stores a table indicating the relation between OCV and SOC shown in FIG. 3. Using the table, the processing means 132 can easily convert the cell voltages to SOCs to obtain the (detected) highest SOC, the (detected) lowest SOC, and the average SOC.

Then, in step S30, the processing means 132 obtains a degree of SOC imbalance of the (detected) highest SOC with respect to the average SOC, ΔSOC1, based on the following Formula (1), and a degree of SOC imbalance of the (detected) lowest SOC with respect to the average SOC, ΔSOC1, based on the following Formula (2), by use of the highest SOC, the lowest SOC, and the average SOC obtained in Step S20.

$$\Delta SOC1 = \text{Highest SOC} - \text{Average SOC} \quad (1)$$

$$\Delta SOC2 = \text{Average SOC} - \text{Lowest SOC} \quad (2)$$

The above has explained operations performed by the processing means 132 immediately after a start of the vehicle. As explained above, as the number of cells included in the storage battery 110 increases, the number of cell voltages subjected to detection processing also increases making it more difficult to perform SOC calculations in real time immediately after a start of the vehicle. For this reason, calculations are performed in advance immediately after a start of the vehicle.

Then, after completion of above-mentioned calculations immediately after a start of the vehicle performed in Steps S10 to S30, the processing means 132 performs processing of Steps S40 to S100, for example, while the vehicle is running. If a method of calculating SOCs from cell voltages of the unit cells is used, for example, while the vehicle is running, as the number of cells included in the storage battery 110 increases, the number of cell voltages subjected to detection processing also increases making it more difficult to perform SOC calculations in real time. With the present embodiment, therefore, instead of detecting cell voltages of the unit cells in the storage battery 110 by use of the battery management ICs 122 immediately after a start of the vehicle, the processing means 132 detects a total voltage Vt by use of the voltage sensor 150, for example, while the vehicle is running.

Then, in Step S40, the processing means 132 detects the total voltage Vt by use of the voltage sensor 150. Here, the total voltage Vt denotes a total of cell voltages of the unit cells included in the storage battery 110. The average cell voltage can be obtained by dividing the total voltage by the number of cells included in the storage battery 110. This method makes it possible to obtain an average cell voltage of the storage battery 110 through a single sensing operation and therefore suitable for real-time calculation.

In Step S20, the no-load cell voltage OCV is obtained immediately after a start of the vehicle and therefore the OCV can easily be converted to SOC based on an OCV-SOC characteristic table. However, when the battery is being charged or discharged, for example, while the vehicle is running, it becomes difficult to obtain the no-load battery voltage OCV. A battery voltage CCV when the battery is charged or discharged with a current value I is represented by Formula (3).

$$CCV = OCV + I \cdot R + Vp \quad (3)$$

where R denotes an internal DC resistance of the storage battery 110, and Vp a polarization voltage thereof.

When the vehicle is running or when the storage battery 110 is being charged or discharged, the OCV can be calculated by subtracting an IR drop and Vp from CCV as represented by Formula (4).

$$OCV = CCV - I \cdot R - Vp \quad (4)$$

Here, the internal DC resistance R and the polarization voltage Vp of the storage battery 110 are pieces of characteristic information regarding the storage battery 110 stored in a storage apparatus provided inside or outside the processing means 132. As characteristic information, it may be possible to use only one common value according to the temperature, SOC, and all other conditions of the storage battery 110 or more than one value according to the temperature, SOC, and other conditions of the storage battery 110. By providing characteristic information according to conditions of the storage battery 110, it is possible to obtain an OCV having higher accuracy.

Then, in Step S50, the processing means 132 obtains a current value I by use of the current sensor 140. In Step S60, the processing means obtains a battery temperature T by use of the temperature sensors 114, which will be used to determine the internal DC resistance R and the polarization voltage Vp.

Then, in Step S70, the processing means 132 obtains the internal DC resistance R and the polarization voltage Vp from the battery temperature T; obtains the battery voltage OCV from the battery voltage CCV, the current value I, the internal DC resistance R, and the polarization voltage Vp based on Formula (4); and calculates SOC by use of the OCV-SOC characteristic table. Here, the SOC calculated based on the supplied voltage Vt is an average SOC (hereinafter referred to as SOCt) of the plurality of cells included in the storage battery 110. As mentioned above, the SOCt can be obtained by use of the total voltage Vt.

With the SOCt obtained by use of the above-mentioned total voltage Vt, an average SOC of the unit cells included in the storage battery 110 can be obtained in real time but SOC imbalance information such as the highest SOC, the lowest SOC, etc. cannot. Therefore, a degree of SOC imbalance of the (detected) highest SOC with respect to the average SOC, $\Delta SOC1$, and a degree of SOC imbalance of the (detected) lowest SOC with respect to the average SOC, $\Delta SOC1$, obtained in Step S30 are used.

In Step S80, the processing means 132 calculates an estimated highest SOC (SOCH) and an estimated lowest SOC (SOCL) by adding degrees of SOC imbalance $\Delta SOC1$ and $\Delta SOC2$ respectively to the SOCt obtained by use of the total voltage Vt.

$$SOCH = SOCt + \Delta SOC1 \quad (5)$$

$$SOCL = SOCt - \Delta SOC2 \quad (6)$$

This makes it possible to obtain an average SOC in real time from the total voltage Vt and also an (estimated) highest SOC and an (estimated) lowest SOC.

On the other hand, a charge current Icmax that can be permitted by the storage battery 110 can be calculated by the following Formula (7), and a discharge current Idmax by the following Formula (8).

$$I_{c}max = (Vmax - OCV)/Rz \quad (7)$$

$$I_{d}max = (OCV - Vmin)/Rz \quad (8)$$

where Rz denotes the impedance of the storage battery 110; Vmax, a maximum voltage of the storage battery 110; and Vmin, a minimum voltage thereof.

The impedance Rz of the storage battery 110 depends on the SOC of the storage battery 110 as shown in FIG. 4A, and also on the temperature as shown in FIG. 4B. Then, by separately providing an impedance Rz according to the temperature or SOC of the storage battery 110, it is possible to obtain permissible currents having higher accuracy.

Further, as shown in FIG. 5, the calculated permissible discharge current increases with increasing SOC and, conversely, the permissible charge current decreases with increasing SOC. Further, when the temperature is low, the impedance Rz of Formulas (7) and (8) is large resulting in a small permissible current; when the temperature is high, the impedance Rz thereof is small resulting in a large permissible current.

The following explains a method of calculating the permissible currents with above-mentioned Formulas (7) and (8) modified and the SOC imbalance information taken into consideration. SOCH and SOCL are obtained by considering the differences $\Delta SOC1$ and $\Delta SOC2$ between the (detected) highest SOC and the (detected) lowest SOC to SOCt obtained from the total voltage Vt. Contrary to conversion of OCV to SOC mentioned above, the processing means 132 performs conversion of SOC to OCV by use of the OCV-SOC characteristic table included in the processing means 132. Specifically, the processing means 132 obtains OCVH corresponding to SOCH as represented by Formula (9) and OCVL corresponding to SOCL as represented by Formula (10).

$$OCVH = OCV\,\text{Map}(SOCH) \qquad (9)$$

$$OCVL = OCV\,\text{Map}(SOCL) \qquad (10)$$

Subsequently, impedance RzH and RzL of the storage battery 110 respectively corresponding to SOCH and SOCL are obtained. If impedance characteristics of the storage battery 110 according to the SOC are provided as a table, RzH and RzL can be determined based on Formulas (11) and (12) using SOCH and SOCL as an input. It is preferable that an Rz characteristic table has values corresponding also to the temperature T of the storage battery 110.

$$RzH = Rz\,\text{Map}(SOCH, T) \qquad (11)$$

$$RzL = Rz\,\text{Map}(SOCL, T) \qquad (12)$$

Then, in Step S90, the processing means 132 obtains a permissible charge current IcmaxH and a permissible discharge current IdmaxL by the following Formulas (13) and (14) based on the OCVH and OCVL calculated by Formulas (9) and (10) and RzH and RzL calculated by Formulas (11) and (12), respectively.

$$IcmaxH = (Vmax - OCVH)/RzH \qquad (13)$$

$$IdmaxL = (OCVL - Vmin)/RzL \qquad (14)$$

Here, as shown in FIG. 6, the permissible charge current IcmaxH calculated by Formulas (13) and (14) is a current value that can be charged such that the cell having the highest SOC does not exceed the maximum voltage Vmax, and the permissible discharge current IdmaxL calculated by Formula (14) is a current value that can be discharged such that the cell having the lowest SOC does not fall below the minimum voltage Vmin. By performing charge-discharge operations within these current ranges, it is possible to optimally control the charge and discharge of the storage battery even if an SOC imbalance occurs. Further, it is also possible to give permissible power by multiplying each of the obtained permissible currents by the battery voltage generated when the permissible current is sent.

The output means 134 transmits the permissible currents or permissible power to a host system, such as the motor control unit 220, and the host system charges and discharges the storage battery 110 within the ranges of the received permissible currents or permissible power to activate the motor 210. With operations in this manner, the storage battery 110 is optimally charged and discharged, thereby realizing a hybrid car that can drive even if an SOC imbalance occurs in the storage battery.

As explained above, in accordance with the present embodiment, the cell voltage of each unit cell when the storage battery is being neither charged nor discharged, for example, at a start of the vehicle, is used to obtain a degree of SOC imbalance. When the storage battery is being charged or discharged, for example, while the vehicle is running, the highest and lowest SOCs are calculated, based on the average SOC obtained from the supplied voltage of the storage battery and the above-mentioned degree of SOC imbalance, to control the charge-discharge current or charge-discharge power. This makes it possible to control the charge and discharge of the storage battery in consideration of state variations of each unit cell even if the battery pack includes a number of component unit cells.

Then, configurations and operations of the storage battery managing apparatus according to another embodiment of the present invention will be explained below with reference to FIG. 7. A system configuration of a hybrid car that mounts the storage battery managing apparatus according to the present embodiment is the same as that shown in FIG. 1.

Figure 7:
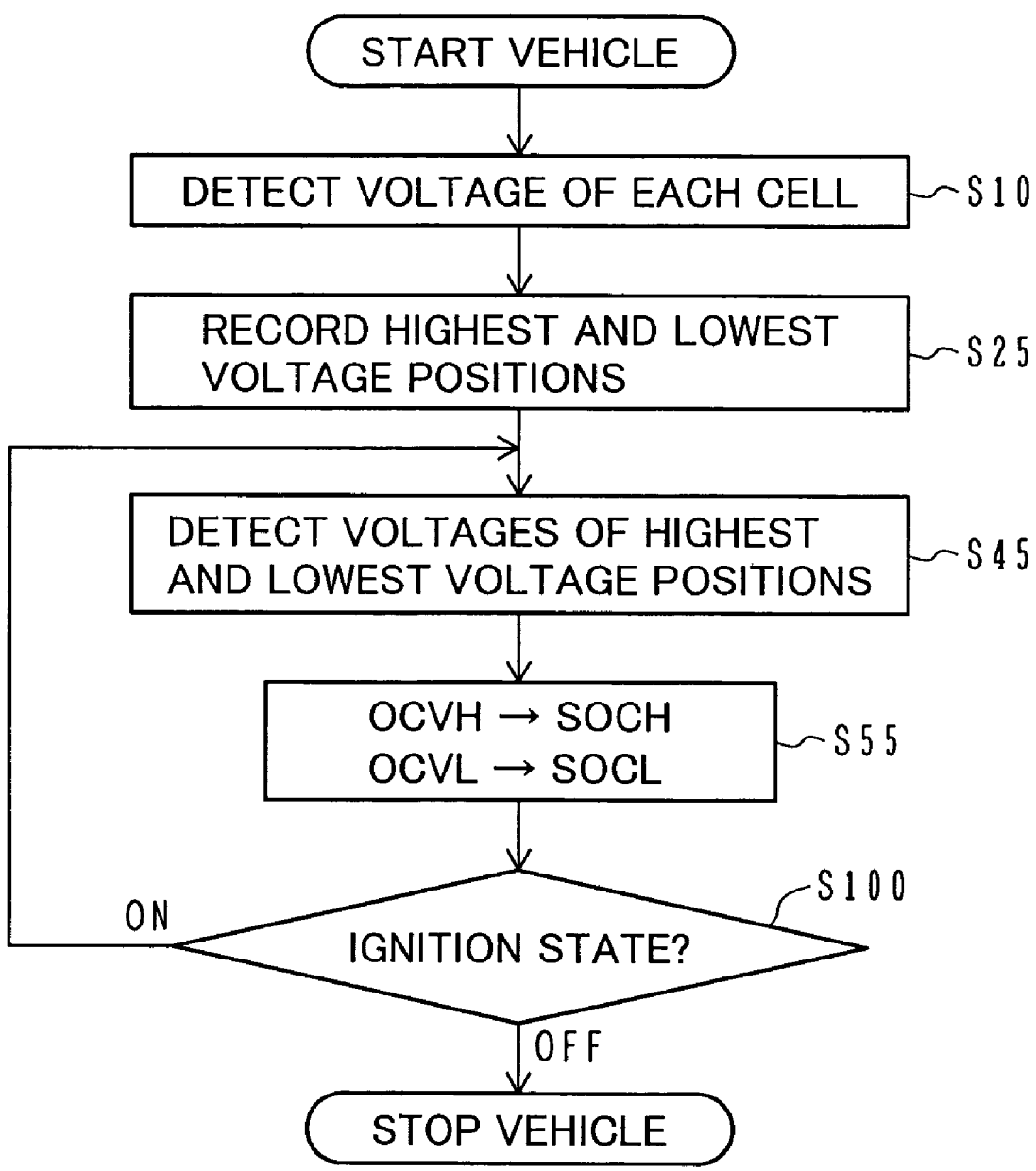
FIG. 7 is a flow chart showing operations of the processing means in the storage battery managing apparatus according to another embodiment of the present invention.

FIG. 7 is a flow chart showing operations of the processing means in the storage battery managing apparatus according to another embodiment of the present invention.

With the present embodiment, the processing means 132 shown in FIG. 1 performs the following operations. Specifically, when the processing means 132 detects that the storage battery 110 is under no-load conditions, for example, at a start of the vehicle, the processing means 132 obtains the cell voltage of all the cells included in the storage battery 110 by use of the battery management ICs 122 in Step S10. After obtaining cell voltages of all the unit cells, the processing means 132 obtains highest and lowest cell voltages of the cells included in the storage battery 110.

Then, in Step S25, the processing means records positions of the cells having the highest and lowest cell voltages.

When it is necessary to perform state detection of the storage battery 110 in real time, for example, while the vehicle is running, it is difficult to sequentially read voltages of all the cells and process information of all the cell voltages. Then, in Step S45, the processing means performs voltage detection only for the cells having the highest and lowest cell voltages by use of positional information of the cells having the highest and lowest cell voltages recorded when the storage battery 110 is under no-load conditions. The processing means reads two different voltages (the voltage of the cell at a detected highest cell voltage position, and the voltage of the cell at a detected lowest cell voltage position) in real time, and then performs the calculation of Formula (4) for each voltage value to obtain an open-circuit voltage OCVH obtained from the highest cell voltage and an open-circuit voltage OCVL obtained from the lowest cell voltage.

Then, in Step S55, the processing means performs conversion of the open-circuit voltage OCVH to SOCH to obtain the impedance RzH of the storage battery 110 based on Formula (11), thereby obtaining the permissible charge current IcmaxH using Formula (13). Further, the processing means performs conversion of the open-circuit voltage OCVL to SOCL to obtain the impedance RzL of the storage battery 110 based on Formula (12), thereby obtaining the permissible discharge current IdmaxL using Formula (14). Further, it is also possible to give permissible power by multiplying each of the permissible currents by the battery voltage generated when the permissible current is sent.

As mentioned above, in accordance with the present embodiment, highest and lowest cell voltages are detected at a start of the vehicle, cell positions having the highest and lowest cell voltages are recorded, only information of the two cells having the highest and lowest cell voltages is obtained under a condition where real-time calculation is required, for example, while the vehicle is running, a permissible charge current or permissible charge power is obtained based on the highest cell voltage, and a permissible discharge current or permissible discharge power is obtained based on the lowest cell voltage, and the storage battery 110 is charged and discharged within the ranges of the obtained permissible currents or permissible power, thus making it possible to optimally control the charge and discharge of the storage battery 110 even if an SOC imbalance occurs. With operations in this manner, the motor 109 is operated based on commands from the inverter 200 by use of the storage battery 110 by use of the permissible currents or permissible power obtained by the storage battery managing apparatus, thereby realizing a hybrid car that can drive even if an SOC imbalance occurs in the storage battery.

In accordance with the present invention, it is possible to ensure charge-discharge control of the storage battery in consideration of state variation of each unit cell even if the battery pack includes a number of component unit cells.

What is claimed is:

1. A storage battery managing apparatus comprising:
   a storage battery having a plurality of chargeable-dischargeable unit cells connected therein;
   cell voltage detection means for detecting the voltage of each unit cell;
   storage battery voltage detection means for detecting the storage battery voltage; and
   current detection means for detecting a current flowing under no-load conditions or charge-discharge conditions of said storage battery;
   wherein the storage battery managing apparatus includes processing means for obtaining a degree of SOC imbalance by use of the cell voltage of each unit cell detected by said cell voltage detection means when said storage battery is being neither charged nor discharged; and for calculating highest and lowest SOCs from the average SOC obtained from the storage battery voltage detected by said storage battery voltage detection means and the degree of SOC imbalance when said storage battery is being charged or discharged, thereby managing charge-discharge current or charge-discharge power.

2. The storage battery managing apparatus according to claim 1, wherein:
   the processing means is configured for:
   converting the cell voltage of each unit cell detected by said cell voltage detection means to SOC when said storage battery is being neither charged nor discharged;
   detecting an average SOC of said storage battery from an average of the plurality of SOCs;
   detecting highest and lowest SOCs from the plurality of SOCs;
   calculating $\Delta SOC1$ by use of the highest and average SOCs (Highest SOC-Average SOC); and
   calculating $\Delta SOC2$ by use of the average and lowest SOCs (Average SOC-Lowest SOC), thereby detecting the degree of SOC imbalance of said storage battery.

3. The storage battery managing apparatus according to claim 2, wherein:
   the processing means is configured for:
   calculating an estimated highest SOC (SOCmax) from the average SOC obtained from the storage battery voltage detected by said storage battery voltage detection means and the degree of SOC imbalance, $\Delta SOC1$, when said storage battery is being charged or discharged; and
   calculating an estimated lowest SOC (SOCmin) from the average SOC and the degree of SOC imbalance, $\Delta SOC2$.

4. The storage battery managing apparatus according to claim 3, wherein:
   the processing means determines a permissible charge current or permissible charge power based on the estimated highest SOC, and determines a permissible discharge current or permissible discharge power based on the estimated lowest SOC.

5. The storage battery managing apparatus according to claim 4, wherein:
   the processing means is configured for
   obtaining an impedance of said storage battery corresponding to the estimated highest SOC;
   determining a current value or a power value, with which said storage battery having an impedance of the estimated highest SOC does not reach a maximum voltage (control target), as a permissible charge current or permissible charge power;
   obtaining an impedance of said storage battery corresponding to the estimated lowest SOC; and
   determining a current value or a power value, with which said storage battery having an impedance of the estimated lowest SOC does not fall below a minimum voltage (control target), as a permissible discharge current or permissible discharge power.

* * * * *